Figure 2:
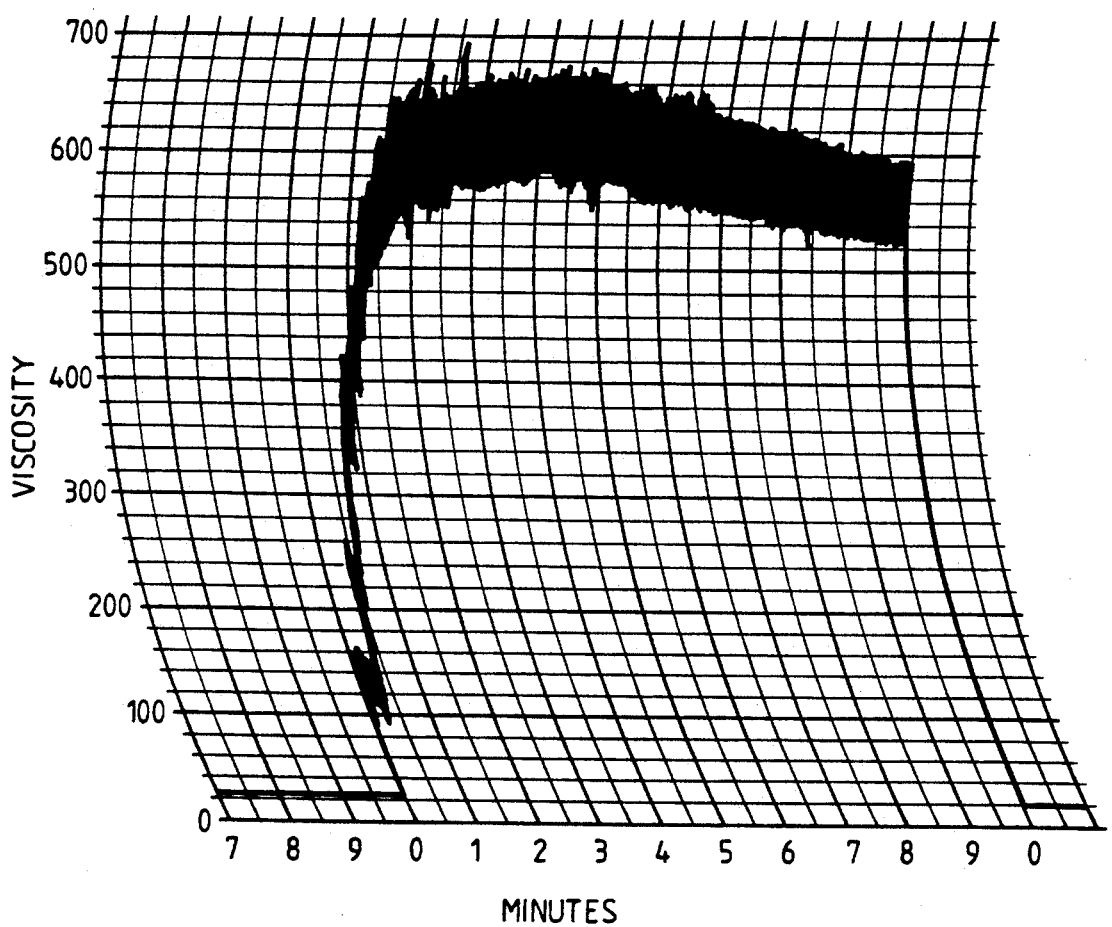

United States Patent [19]

Payne et al.

[11] Patent Number: 5,308,635
[45] Date of Patent: May 3, 1994

[54] GLU-D1 WHEAT FLOUR BLENDS

[75] Inventors: Peter I. Payne; Julie A. Seekings, both of Cambridge, United Kingdom

[73] Assignee: Unilever Patent Holdings

[21] Appl. No.: 897,652

[22] Filed: Jun. 11, 1992

[30] Foreign Application Priority Data

Jun. 11, 1991 [GB] United Kingdom ............ 9112556

[51] Int. Cl.$^5$ .................. A01H 1/02; A01H 5/00; A21D 2/00; A21D 13/06
[52] U.S. Cl. ................................ 426/549; 426/622
[58] Field of Search ........................ 426/622, 549

[56] References Cited

PUBLICATIONS

Payne, *Genetics of Wheat Storage Proteins and the Effect of Allelic Variation on Bread-Making Quality*, Annual Review of Plant Physiology, vol. 38, 1987, pp. 141-153.

Primary Examiner—Donald E. Czaja
Assistant Examiner—Mary S. Mims
Attorney, Agent, or Firm—Cushman, Darby & Cushman

[57] ABSTRACT

In the blending of wheat flour, the addition of flour from a Glu-D1 double mill wheat to reduce the viscoelastic properties of dough made from the flour blend. The flour can be hard-milling or soft-milling.

8 Claims, 7 Drawing Sheets

Fig.1.

HMW GLUTENIN SUB-UNITS: 2, 7, 12

MERCIA

GLU-D1 WHEAT FLOUR BLENDS

This invention relates to plants and to products derived therefrom.

When the grain of bread wheat (*Triticum aestivum*) is milled to a flour and mixed with water to form a dough, it develops unique viscoelastic properties.

Viscoelasticity is a balance between two opposite forces, extensibility (viscous flow) and elasticity, and this balance varies significantly between wheat varieties. Viscoelasticity is primarily genetically controlled although it is affected by growing conditions. The viscoelastic properties of a dough, and the milling properties of the grain, primarily determine the types of food that can be produced from a wheat. Wheat is used to make bread (leavened, non-leavened, flat, round or steamed), biscuits/cookies, noodles, breakfast cereals, wafers, and batters (either for food preparations, e.g. crumpets, pancakes, or as binding agents). The ratio of elasticity to extensibility needs to be high for leavened bread, intermediate for noodles and flat breads such as chapatis, and very low for wafers and semi-sweet biscuits. A bread dough has to be extensible to allow it to expand during fermentation at the proving stage of bread-making. As expansion occurs, however, elastic forces must come into play so that, at optimal dough volume, expansion forces are counterbalanced by contraction (elastic) forces and these forces must be maintained until the starch gelatinises in the oven to form bread.

Wheat breeders usually differentiate wheat lines into hard-milling varieties and soft-milling varieties.

In a hard-milling wheat, there is strong adhesion between the protein and starch in the cells of the endosperm. Milling of the grain requires a lot of energy, and the starch granules suffer extensive damage. The flour can absorb a large amount of water during dough formation, and a final product made from the dough will normally have a relatively high moisture content. Hard-milling varieties are preferred in many countries for bread making, for example the United Kingdom and North America, because the high moisture content delays the onset of staleness.

In a soft-milling wheat, adhesion between the protein and starch is weaker. Relatively little damage is caused to the starch during milling, and doughs of lower moisture content are formed. Soft-milling wheats are preferred in the manufacture of dry products such as biscuits, because less energy is needed to remove moisture during baking. In some countries, such as France and Germany, bread is traditionally made from soft-milling wheats, but as a consequence it becomes stale after only a few hours.

The precise method of making bread varies accordinq to the type of bread that is being made, the country of manufacture and the size of the bakery. In the UK, the Chorleywood bread-making process has been developed to enable dough of low protein content and low mixing strength to be made by a rapid process that requires only one very short, but high-energy, mix and one proving time. This process is described in Chamberlain et al, *Baker's Digest*, October 1962, pages 52–53. It is primarily used by the larger bakeries to make white bread. Wholemeal bread may also be made by this method, although a stronger flour with higher protein content is usually used. A commonly used alternative method to make bread in the UK is the bulk fermentation process. This takes much longer to complete, and usually involves a two-minute slow mix and a double fermentation of two and three hours respectively, followed by mouldings, proving and baking.

In other countries, different bread-making processes can be employed. In the USA, for instance, the sponge-dough process is very popular. A sponge is first produced with about 70% of the flour and 40% of the total water. After a long fermentation, the rest of the ingredients are added, followed by fermentation and baking. A much stronger dough is required than that used in the UK.

The method by which millers produce flour blends that are suitable for different breads and other food products also varies according to the country. In Germany, wheat varieties are graded in terms of dough mixing quality from A9 (strong) to C1 (very weak). Different combinations and percentages of these grades are used to make various types of bread (including rye bread and mixed rye/wheat bread). Similarly, in France, wheats are classified into quality types A, B1, B2, C1, C2, D1 and D2, the first being the strongest, and the last the weakest. In the UK, the miller has traditionally relied on strong mixing varieties from Canada, and has mixed them with set proportions of weak-mixing, home-grown varieties to obtain the required viscoelasticity. In the last two decades, the improvement in the bread-quality of UK wheat varieties, and other factors, has led to a great reduction in Canadian wheat grain imports. Nevertheless, the sophisticated blending used in many continental European countries has not been adopted, reliance being placed instead on a uniform, bread-quality grade.

In recent years, wheat breeders world-wide have been exploiting the discovery that the number and type of high molecular weight (HMW) glutenin subunits primarily determine the viscoelastic properties of doughs (reviewed by Payne, P. I.; Annual Review of Plant Physiology, pp 141–153, volume 38, 1987). In the early stages of many wheat breeding programmes, the proteins of embryo-less half grains are analysed by gel electrophoresis and the embryo halves of those with the desired combination of HMW glutenin subunits are grown for further selection. Varieties with stronger mixing properties have been developed. Currently, two winter-wheat varieties which are on the UK National List, ('Fresco' and 'Torfrida'), are probably too strong to be used as the sole varietal source of flour for making commercial white bread by the Chorleywood bread making process, but are more suited for wholemeal bread and for puff pastry products. These varieties could be used for white bread production if they were blended with significant amounts of flour from weaker mixing bread quality varieties. The disadvantage for the miller is that he has to store large quantities of different flour types to make appropriate blends.

The present invention enables flours that are too strong for a particular product to be corrected by the addition of only small amounts of a very weak flour (hereafter called the "corrective flour"), so that the miller, and others that blend flour, only have to store relatively small amounts of the corrective flour.

In our European patent application 91301272.0 we describe soft-milling bread wheats that contain a null form of the gene locus Glu-D1, coding for high-molecular weight (HMW) glutenin subunits, and occurring on the long arm of chromosome 1D. These wheats contain between one and three different HMW glutenin subunits: one or two subunits coded by genes at locus Glu-B1 and zero, or one at Glu-A1. This compares with all commercially known varieties that contain between 3 and 5 different HMW glutenin subunits: two coded by genes at locus Glu-D1, one or two at Glu-B1 and zero or one at Glu-A1. Lack of expression of the Glu-D1 locus causes wheat doughs to be extremely extensible and to be deficient in elastic regain properties.

The present application makes use of these highly unusual viscoelastic properties to modulate the dough properties of overstrong wheats and so optimise them for making bread and other food products. The wheat may be hard-milling or soft-milling, but for maximum effect should be derived from varieties that are greatly suited to the food process in question, but lacking the Glu-D1 locus.

The invention provides a flour blend comprising Glu-D1 double null wheat in an amount sufficient to lower the viscoelastic properties of dough made from the flour blend.

In general, the proportion of Glu-D1 double null wheat in the flour blend will be at least about 2% by weight. More usually, at least about 5% by weight will be required. A typical blend will contain from about 10 to about 20% by weight of Glu-D1 double null wheat. Usually the proportion need not be greater than about 25% by weight. The total content of Glu-D1 double null wheat in the blend can comprise a combination of 2 or more such wheats, if desired. The Glu-D1 double null wheat can be hard-milling or soft-milling.

The invention also provides doughs made from such blends, and food products such as bread prepared from such doughs. The invention encompasses the use of a Glu-D1 double null wheat to modify the properties of a flour blend.

The invention can be applied in the manufacture of a wide range of flour blends. The blends can be made wholly from wheats, either white or wholemeal. Combinations of wheat with one or more other cereals can be used, such as rye, maize (corn), oats, rice or malt. Other ingredients that are sometimes added to impart special character are carrot flakes and soda (salt).

For example, conventional flours destined for making white, sliced bread in the UK can be too strong mixing for this process because they are derived, at least in part, from the National Listed variety 'Torfrida'.

An excellent corrective flour for UK millers can be made from 'Mercia 6+8', closely related to 'Mercia', a variety widely grown for conversion into white, sliced bread. The former variety contains HMW subunits 6+8 only (Glu-B1 encoded) and the latter contains 6+8, and 5+10 (Glu-D1 encoded). 'Mercia 6+8' can be developed by crossing any variety containing the Glu-D1 null (for example 'Galahad-7') with 'Mercia' and backcrossing the $F_1$ progeny again with 'Mercia'. The resulting grains that contain the Glu-D1 null (determined by screening embryo-less half grains by protein electrophoresis) are repetitively backcrossed to 'Mercia' with selection for the Glu-D1 null, and then by selfing to produce 'Mercia 6+8' that is homozygous for the Glu-D1 null.

Strong-mixing wheats are required in the production of many products. Examples with decreasing requirements for dough strength are flaked pastry, wholemeal bread, white bread, noodles and chapatis. Flours that are too strong mixing for these products may be optimally adjusted to the required strength by adding small, but specific, amounts of a corrective wheat.

The effect of adding flour derived from varieties with the Glu-D1 double null is not only to decrease dough strength and elasticity but also to increase extensibility. Furthermore, there is a requirement by the milling trade to provide soft-milling flours that produce extensible doughts. Unfortunately there has been a general increase in the availability varieties in Europe and North America that carry the 1B/1R chromosome. This chromosome, whose short arm is derived from rye rather than wheat, is thought to be associated with high grain yields, and this trend is likely to continue. Unfortunately for the miller, doughs made from these varieties have poor extensibilities and generally do not meet the extensibility specifications from manufacturers of certain biscuits, crackers and cookies. The addition of small amounts of flour from a variety possessing the Glu-D1 double null trait to 1B/1R varietal flours, e.g. at the mill, is likely to enable such flours to meet these extensibility specifications.

Preparation of "Galahad-7" Glu-D1 Double Null Wheat

The viscoelasticity that develops in wheat doughs is primarily a function of the protein from the endosperm, called gluten, which usually comprises between 8% and 15% of the dry weight of wheat flour. The biochemistry and genetics of gluten have been extensively researched, with a view to improving the bread-making quality of wheat. It is now generally recognised that high-molecular-weight (HMW) subunits of glutenin, which make up only about 6-10% of the gluten content of wheat, are the key components in conferring elasticity and dough mixing stability. These HMW subunits are coded by three homoeoallelic loci in bread-wheat, called Glu-A1, Glu-B1 and Glu-D1, and are located on the long arms of chromosomes 1A, 1B and 1D respectively. Each locus contains two genes, called "x" and "y", so in principle a wheat could have six different HMW glutenin subunits. However, the "y" gene at Glu-A1 is present but non-functional in all known commercially-cultivated wheats, so the maximum number of different subunits is five. Also, in some wheats, the "y" gene at Glu-B1 and the "x" gene at Glu-A1 are independently non-functional, so the minimum number of HMW glutenin subunits in any presently-available commercial wheat is three.

An experiment which indicated that HMW glutenin subunits confer elasticity to doughs was described by Lawrence, MacRitchie and Wrigley, *Journal of Cereal Science*, vol. 7, pages 109-112 (1988). They made use of one of the genotypes that comprise the primitive landrace from India called "Nap Hal". Samples of "Nap Hal" are freely available from several public germplasm collections. For example, it is available under Accession No. 1362 from the AFRC Institute of Plant Science Research, Norwich, UK. Because "Nap Hal" is a landrace, it is genetically mixed and it is therefore necessary to purify the sample to homogeneity by selection, e.g. using SDS-PAGE techniques on half-grains.

Approximately 20% of the grains that comprise "Nap Hal" are extremely unusual in lacking two HMW subunits coded by the "x" and "y" genes of Glu-D1, which we shall refer to herein as the "Glu-D1 double null" trait.

By repetitively backcrossing the "Nap Hal" line to the Australian bread-quality hard-milling variety "Gabo", which possesses five HMW glutenin subunits, Lawrence et al were able to produce sister lines genetically very similar to "Gabo" but varying in the number of HMW subunits. The line containing five HMW subunits had strong dough elasticity and good bread-making quality, like "Gabo". In contrast, the line with the Glu-D1 double null combined with a non-functional Glu-A1 "x" gene, giving it a total of only two HMW subunits, had minimal dough elasticity and very poor bread-making quality. Because such genetic lines containing the Glu-D1 double null have very poor bread-making quality, none has been knowingly introduced into wheat breeding programmes or released as commercial material. Furthermore, there has been no suggestion in the scientific literature of any potential advantages of the Glu-D1 double null trait if inserted into wheat genotypes that are not used in bread-making but are processed into other wheat-based foods.

A soft-milling wheat can be obtained for example by transferring the Glu-D1 double null trait, e.g. from "Nap Hal" or from a "Nap Hal" derivative which is hard-milling, by repetitively backcrossing into a soft-milling wheat, such as "Galahad", and selecting half-grains at each generation, e.g. by SDS-PAGE analysis.

The viscoelastic properties of a wheat in accordance with the invention will be determined primarily by the number of different HMW glutenin subunits it contains. The possibilities are shown in the Table below.

TABLE

Possible HMW glutenin subunit combinations of genotypes in accordance with the invention

| | Glu-A1 "x" | Glu-B1 "x" | Glu-B1 "y" | Glu-D1 "x + y" | Subunit No. |
|---|---|---|---|---|---|
| 1 | + | + | + | − | 3 |
| 2 | − | + | + | − | 2 |
| 3 | − | + | − | − | 1 |
| 4 | − | − | + | − | 1 |
| 5* | − | + | − | − | 1 |
| 6* | − | − | + | − | 1 |

The genotypes in the Table have been arranged approximately with decreasing orders of elasticity expected in their doughs. Genotypes 5* and 6* have identical HMW subunit compositions to genotypes 3 and 4 respectively, except that they contain the 1BL/1RS chromosome that occurs in many high-yielding feed/-biscuit wheats (L=long arm, S=short arm). They provide less-elastic doughs than their counterparts because chromosome 1RS (derived from rye) contains the Gli-R1 locus instead of the Gli-B1 on 1BS, present in most wheats. Gli-B1 contains a family of genes coding for low-molecular-weight (LMW) subunits of glutenin, whereas Gli-R1 does not. This reduces even further the amount of elastic glutenin in doughs and batters.

A particular strain of semi-dwarf, red-grained, soft-milling winter wheat having this essential characteristic, designated "Galahad-7", has been deposited, in accordance with the provisions of the Budapest Treaty, in the National Collections of Industrial and Marine Bacteria, Aberdeen, Scotland under Accession No. NCIMB 40251, on 19 Jan. 1990. The deposited sample, which exhibits residual genetic variation, does not constitute seed that would be regarded as a true registerable plant variety. Nevertheless, the sample is true-breeding with regard to the Glu-D1 double null trait.

For a wheat to exhibit the Glu-D1 double null trait, each of the "x" and "y" genes at Glu-D1 should be either inactive or absent. Generally, both will be absent.

By way of example only, a soft-milling Glu-D1 double null strain of wheat can be produced by:

a) selecting a hard-milling wheat strain possessing the Glu-D1 double null trait;

b) crossing the hard-milling strain with a soft-milling wheat strain which naturally produces relatively elastic dough;

c) back-crossing the resulting strain into a soft-milling wheat strain;

d) selecting grains exhibiting the Glu-D1 double null trait at half the normal gene dosage, by analysis of embryo-less half grains, the corresponding half-grains being retained for germination;

e) germinating the corresponding half-grain of the selected soft-milling Glu-D1 double null strain, and conducting a further back-crossing and half-grain analysis for the Glu-D1 double null trait;

f) germinating the corresponding half-grains from step (e), and growing and allowing to self-pollinate grains containing the Glu-D1 double null trait in the homozygous state; and g) determining which of the resulting lines homozygous for the Glu-D1 double null trait are soft-milling.

A commonly grown soft wheat, variety "Galahad", was crossed with a "Sicco" line containing the "Nap Hal" Glu-D1 double null ("Nap Hal"×"Sicco"[5]). "Galahad" contains 3 HMW subunits, namely subunit 7 coded by the "x" gene of Glu-B1 and subunits 2 and 12 coded by the "x" and "y" genes respectively of Glu-D1. The "y" gene of Glu-B1 and the "x" and "y" genes of Glu-A1 are non-functional. The $F_1$ generation was backcrossed to "Galahad", and embryo-less half grains analysed by means of SDS-PAGE. About half the grains had weak bands of subunits 2 and 12 (encoded by the Glu-D1 locus from "Galahad"), as opposed to strong bands, and these alone were germinated and the adult plants backcrossed again to "Galahad". Embryo-less half grains were again analysed by SDS-PAGE and those with weak bands corresponding to subunits 2 and 12 were selected and germinated. The mature plants were allowed to self pollinate, and those grains that completely lacked subunits 2 and 12 (about 25% of the total) were selected, and the corresponding half-grains germinated in a cold glasshouse to produce a large stock of selfed seed. This line, as shown in FIG. 1, contained only one HMW glutenin subunit, subunit 7 that is coded at by the "x" gene Glu-B1 and inherited from "Galahad". This line was designated "Galahad-7", and is the strain deposited as NCIMB 40251. FIG. 1 of the accompanying drawings depicts SDS-PAGE analysis of seed proteins from "Galahad" (G) and "Galahad-7" (G-7).

The Glu-D1 double null trait is caused by the loss of the genes from this locus rather than the genes still being present but altered so they cannot function. DNA was extracted from leaves of (Nap Hal×Sicco[5]), the Glu-D1 double null donor parent of "Galahad-7", digested with the restriction enzyme SstI and fractionated by agarose gel electrophoresis. The fractionated DNA was transferred to a Zetaprobe nylon membrane and probed with the radioactive cDNA pTag 1290, which specifies part of the coding sequence of a HMW glutenin subunit gene. The probe hybridised with only three DNA bands, two derived from chromosome 1A and the other from 1B. The chromosome 1D band (i.e. that containing the Glu-D1 locus) that is detected in all varieties, and which usually has a size of 4.8 Kb for this restriction enzyme, was absent.

EXPERIMENT 1

Bread-Making Quality of 'Torfrida' Flour, 'Mercia' Flour, and a 90% 'Torfrida' 10% 'Galahad-7' Blend A small-scale Chorleywood bread-making process was used that had been optimised to mimic the results obtained in commercial bakeries in the UK. Each flour sample taken from the 1990 harvest, was divided into two portions, and the two portions were used respectively to prepare a slightly undermixed (low energy input) dough and a slightly overmixed (high energy input) dough, relative to normal commercial practice. The energy inputs were 5 watt-hours per kg and 12 watt-hours per kg respectively.

Each dough sample was baked under standard conditions to produce bread loaves. The loaves were evaluated by expert testers by determining loaf volume and subjectively assessing loaaf score (general appearance; nature of 'break'; colour of the crust; and the softness, resiliance, texture and colour of the internal crumb structure). An overall relative bread quality score was also determined.

'Torfrida' flour is too strong for the Chorleywood Process, and consequently performed very badly at low input, because the dough used to make the bread was clearly undermixed. The 'Torfrida/Galahad-7' blend was also judged to be overstrong but only slightly so at low input, and was only slightly inferior to bread made from 'Mercia', the current UK standard.

|  | High input Baking | | Low input Baking | | |
|---|---|---|---|---|---|
|  | Volume (ml) | Loaf Score | Volume (ml) | Loaf Score | Bread Quality |
| 'Torfrida' | 1790 | 86 | 1570 | 61 | 4.5 |
| 90% 'Torfrida'/ 10% 'Galahad-7' | 1750 | 94 | 1630 | 73 | 6.8 |
| 'Mercia' | 1790 | 80 | 1720 | 76 | 8.0 |

Comparable results were obtained with four-times replicated samples from the 1991 harvest.

EXPERIMENT 2

Viscoelastic Measurements on 'Torfrida' Dough, and a Dough Made From a 90% 'Torfrida 10% Galahad-7' Blend Two instruments were used to measure the viscoelasticity of doughs made from the two flours: The Brabender Farinograph using the International Association for Cereal Chemistry (ICC) method No. 115 and the 300 g mixing bowl, and the Brabender Extensograph. The results are shown graphically in FIGS. 2-7 of the accompanying drawings.

Figure 3:
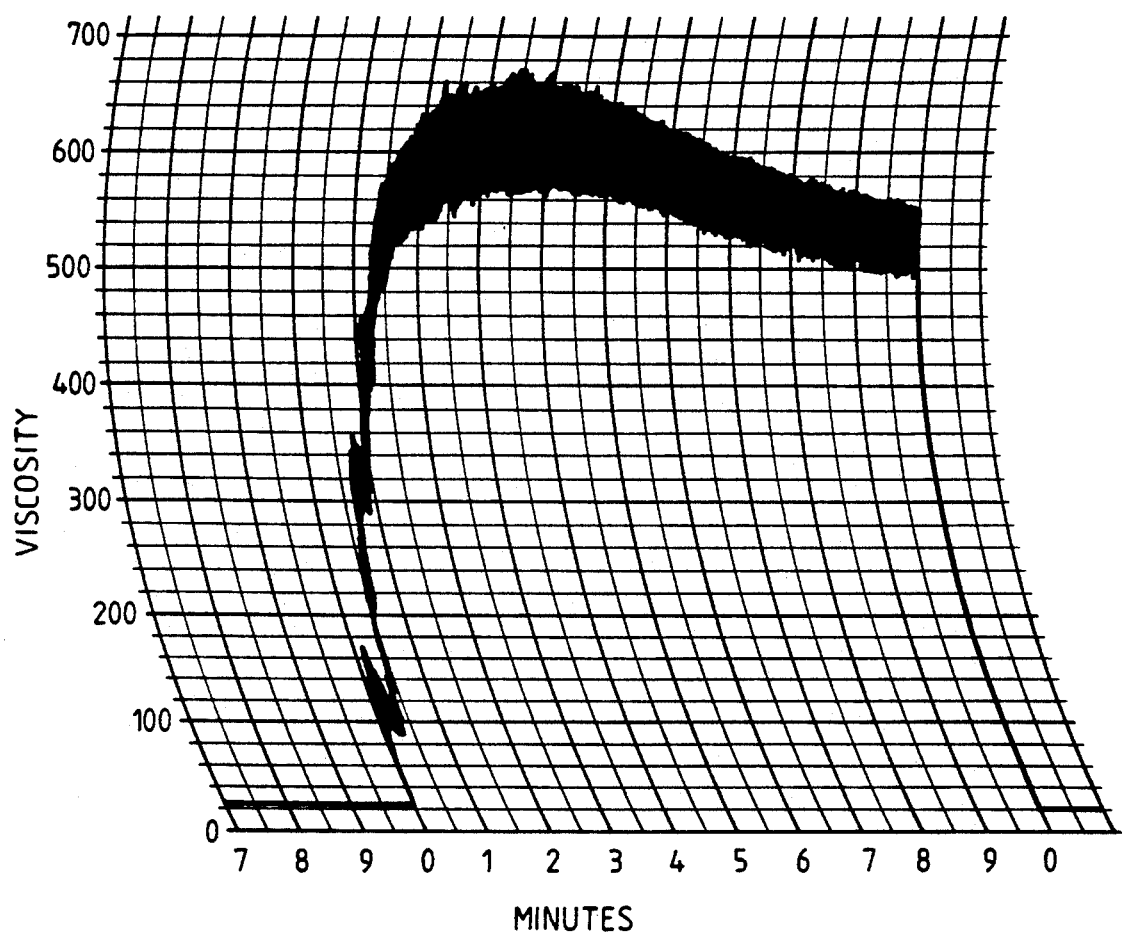
Figure 4:
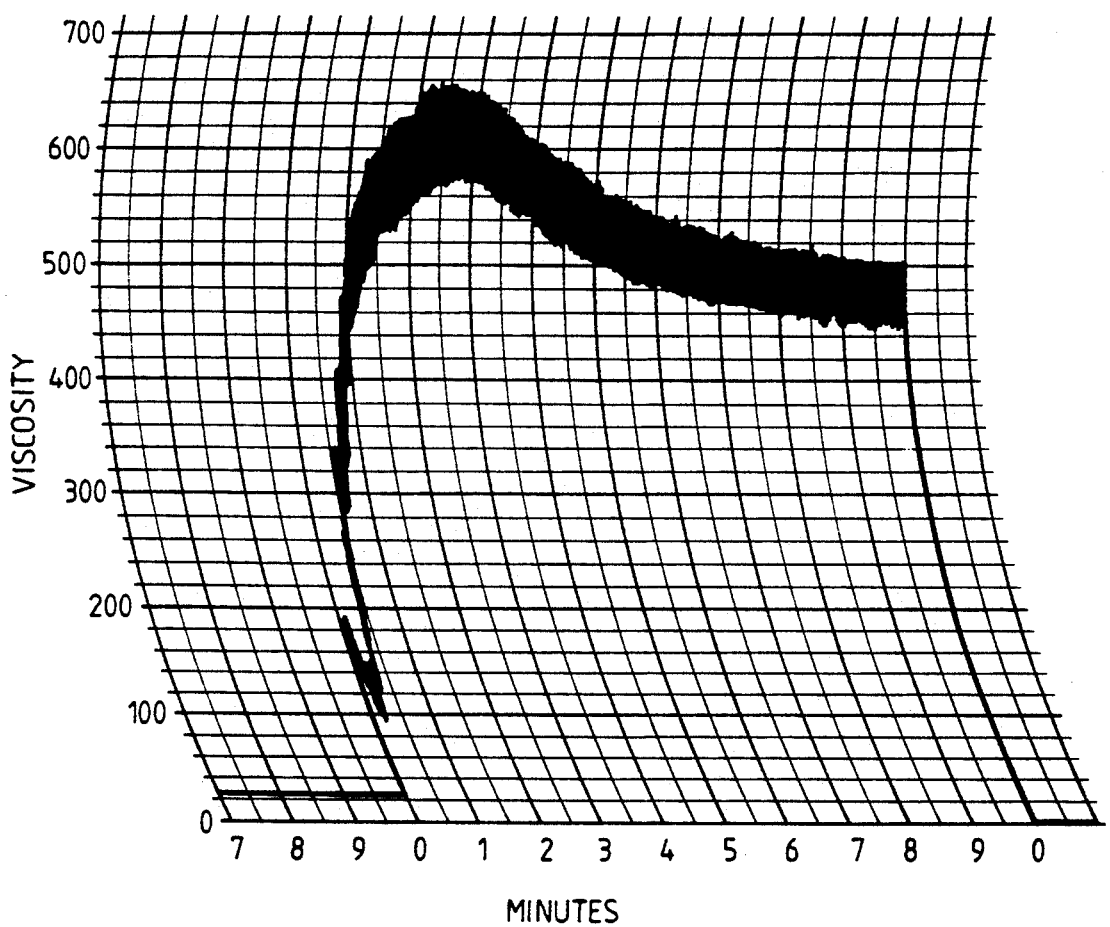
Figure 5:
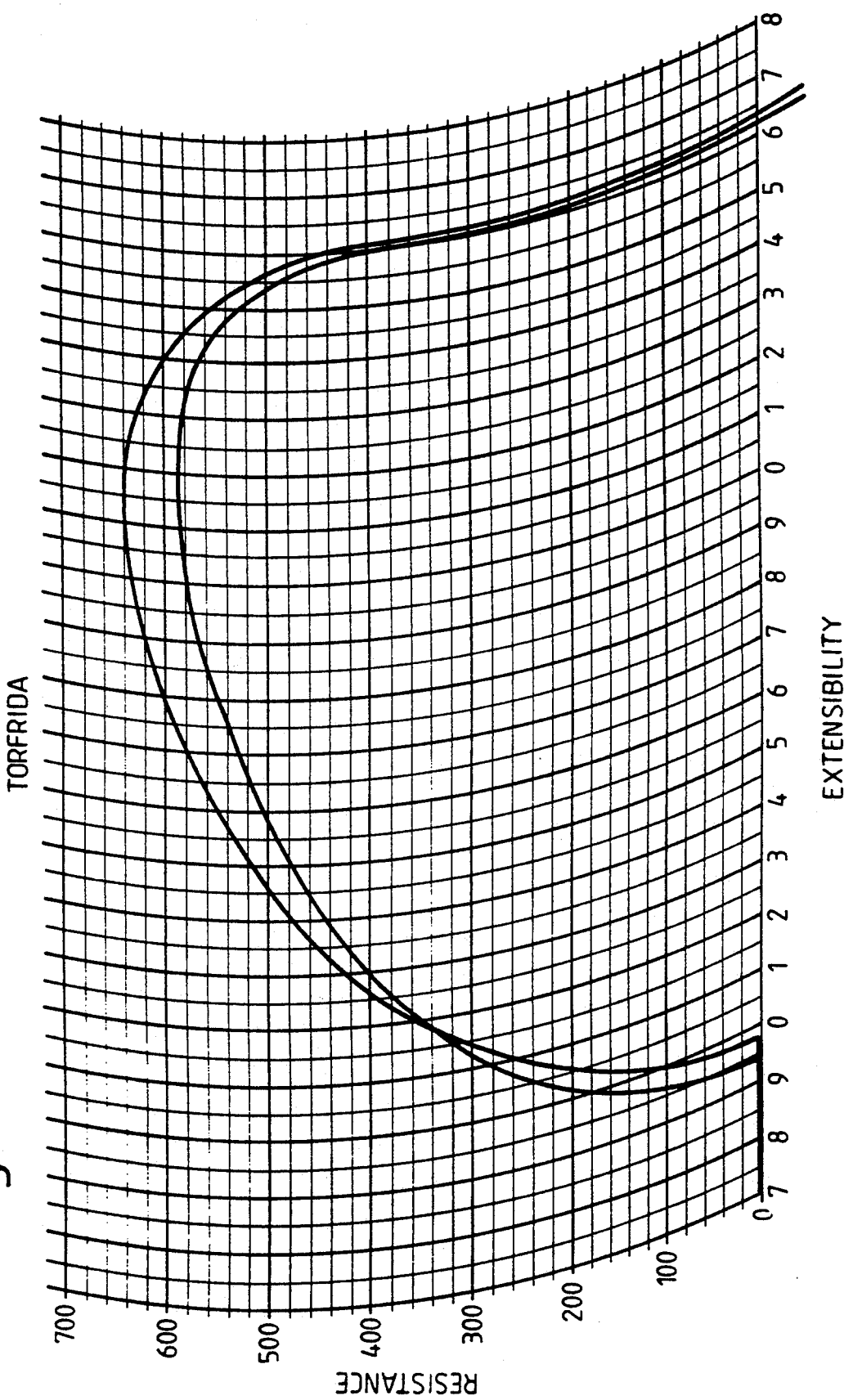

The Farinograph curves demonstrated that dough of 'Torfrida' was strong mixing (FIG. 2), as expected from the test baking results in Experiment 1, and that made from the 90% 'Torfrida'/10% 'Galahad-7' mixture was significantly less so (FIG. 3). Thus, using the Farinograph, 'Torfrida' dough took longer to reach peak mixing viscosity (4.3 versus 3.6 minutes), it had a greater stability (6.0 versus 4.5 minutes) and a lower degree of softening (70 versus 90 viscosity units). Also the thickness of the Farinograph curve (an indicator of elasticity) was greater for 'Torfrida' than for the 'Torfrida'/'Galahad-7' mixture. The Farinograph curve for 'Mercia' (FIG. 4) indicated that it was weaker mixing than the 'Torfrida'/'Galahad-7' mixture.

Farinograph data from flours derived from the 1991 harvest gave similar results to those described above.

|  | Peak Development | Stability | Degree of Softening |
|---|---|---|---|
| 'Torfrida' | 4.3 | 5.6 | 60 |
| " | 3.6 | 5.7 | 55 |
| " | 4.3 | 5.6 | 50 |
| Mean | 4.1 | 5.6 | 52 |
| 'Torfrida' with 10% 'Galahad-7' | 3.8 | 5.0 | 80 |
| " | 3.0 | 4.5 | 85 |
| " | 3.8 | 5.0 | 80 |
| Mean | 3.5 | 4.8 | 82 |

These results clearly show that 'Torfrida', when blended with 10% 'Galahad-7', has a shorter time to peak development, a reduced stability and a greater degree of softening. All this data shows that adding a small amount of 'Galahad'7' flour to a strong mixing flour significantly reduces its mixing strength.

Figure 6:
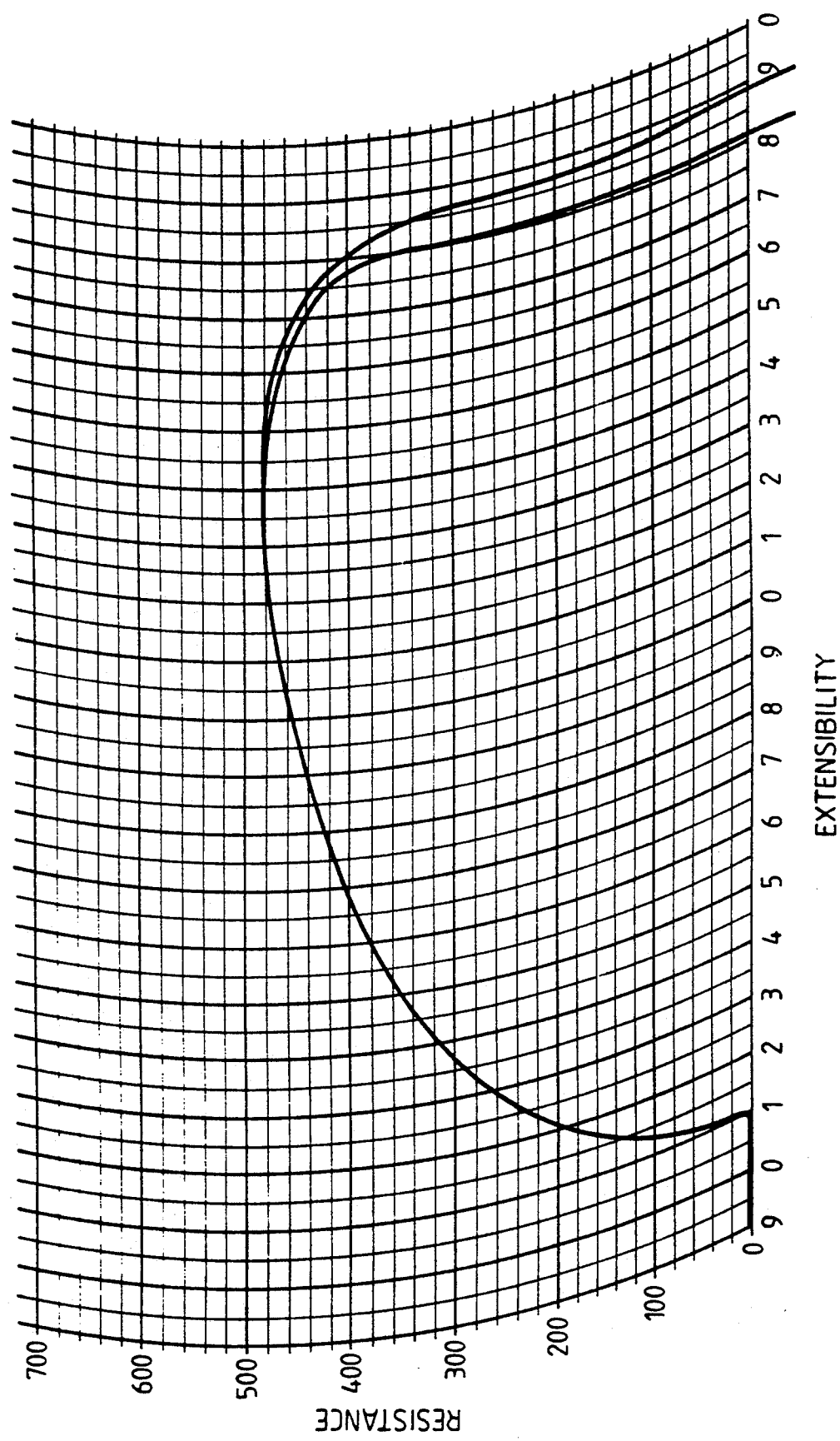
Figure 7:
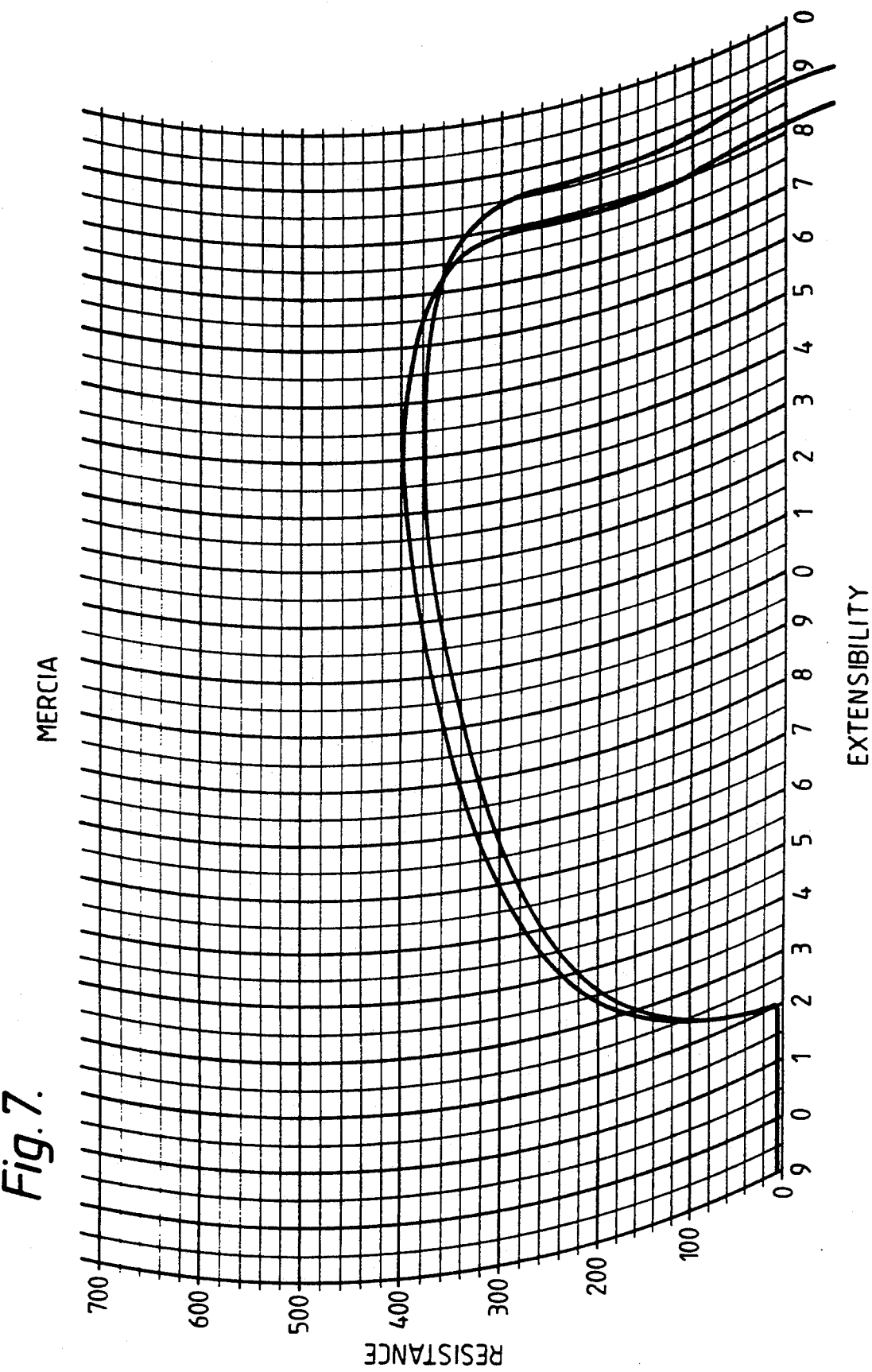

In order to obtain a greater span of resistance values with the Extensograph, the ICC method No. 114 was modified by increasing the salt concentration from 2% to 4% and decreasing dough water content to give a viscosity of 600 Brabender Units at the end of the second and final mixing period. By this method the mean resistance to stretching for 'Torfrida' dough was 609 Brabender Units (FIG. 5) and its extensibility (the time from start of stretching to dough breakage) was 16.9 minutes. Adding 10% 'Galahad-7', which itself produces a very extensible, but poorly resistant, dough, caused resistance to drop by 17% and extensibility to increase by 5% (FIG. 6). Dough of 'Mercia' is much less resistant than 'Torfrida' and significantly less than that of the 90% 'Torfrida'/10% 'Galahad-7' blend (FIG. 7).

EXPERIMENT 4

The Effect on Viscoelastic Properties of Mixing Grain of "Beaver" with Increasing Amounts of Grain of "Galahad-7"

The variety "Beaver" is a UK-bred soft milling wheat that contains the 1B/1R chromosome. Like all varieties containing this chromosome, it has the tendency to give poor dough extensibility properties, the opposite of what is required for biscuit and cracker manufacture. Varieties with this chromosome are very likely to dominate the soft wheat markets in Europe, North America and elsewhere because it is believed to be associated with high grain yields. This experiment shows that adding small amounts of "Galahad-7" grain to grain of "Beaver" prior to milling significantly increases the extensibility properties of the resulting dough, and consequently makes it more suitable for making biscuits and the like. On average, each 10% addition of "Galahad-7" causes a 9% increase in extensibility and a 10% decrease in resistance of the dough. These results were obtained with the Brabender Extensograph using the modified method with increased salt concentration as described in Experiment 2.

| VARIETY BLEND | | EXTENSIBILITY | | RESISTANCE | |
|---|---|---|---|---|---|
| "Beaver" | "Galahad-7" | (cm) | % increase | (BU) | % decrease |
| 100% | 0% | 14.6 | — | 264 | — |
| 90% | 10% | 16.3 | 11.6 | 207 | 21.5 |
| 80% | 20% | 16.5 | 13.0 | 216 | 18.2 |

-continued

| VARIETY BLEND | | EXTENSIBILITY | | RESISTANCE | |
|---|---|---|---|---|---|
| "Beaver" | "Galahad-7" | (cm) | % increase | (BU) | % decrease |
| 70% | 30% | 17.8 | 21.9 | 192 | 27.3 |
| 60% | 40% | 22.5 | 35.1 | 162 | 38.6 |

We claim:

1. A flour blend comprising a flour which has undesirably high viscoelastic properties and Glu-D1 double null wheat in an amount sufficient to lower the viscoelastic properties of dough made from the flour blend.

2. A flour blend according to claim 1 comprising at least about 2% by weight of Glu-D1 double null wheat.

3. A flour blend according to claim 1 comprising at least about 5% by weight of soft-milling Glu-D1 double null wheat.

4. A flour blend according to claim 1 comprising at least about 10% by weight of hard-milling Glu-D1 double null wheat.

5. A wheat flour blend according to claim 1.

6. Dough made from a flour blend according to claim 1.

7. A bread made from a dough according to claim 6.

8. The method of reducing the viscoelastic properties of a flour which comprises blending with said flour, an amount of a Glu-D1 double null wheat in amount sufficient to reduce said viscoelastic properties.

* * * * *